United States Patent [19]

Matsubara

[11] Patent Number: 5,155,467
[45] Date of Patent: Oct. 13, 1992

[54] INCLINATION ANGLE DETECTION APPARATUS AND AUTOMOBILE THEFT ALARM APPARATUS USING THE SAME

[75] Inventor: Manabu Matsubara, Kobe, Japan

[73] Assignee: Fujitsu Ten Limited, Hyogo, Japan

[21] Appl. No.: 685,891

[22] Filed: Apr. 16, 1991

[30] Foreign Application Priority Data

Apr. 17, 1990 [JP] Japan .................... 2-101049

[51] Int. Cl.⁵ .............................. B60R 25/10
[52] U.S. Cl. ................... 340/429; 340/440; 340/511; 340/566; 340/665; 340/689; 340/683; 200/61.45 R; 200/61.52; 200/52 A; 307/9.1; 307/10.2
[58] Field of Search ............... 340/429, 671, 440, 689, 340/661, 669, 510, 511, 566, 665, 683; 200/61.45 R, 61.52, 52 A; 307/9.1, 10.1, 10.2

[56] References Cited

U.S. PATENT DOCUMENTS

| | | | |
|---|---|---|---|
| 4,057,791 | 11/1977 | Bimmerle et al. | 340/429 |
| 4,359,717 | 11/1982 | Huber et al. | 340/429 |
| 4,584,569 | 4/1986 | Lopez et al. | 340/429 |
| 4,651,128 | 3/1987 | Kolb | 340/440 |
| 4,684,928 | 8/1987 | Takahashi et al. | 340/683 |

FOREIGN PATENT DOCUMENTS

60-82466  5/1985 Japan .
60-197449 10/1985 Japan .
63-255664 10/1988 Japan .

*Primary Examiner*—Donnie L. Crosland
*Attorney, Agent, or Firm*—Wenderoth, Lind & Ponack

[57] ABSTRACT

An automobile theft alarm apparatus for detecting the variation of the inclination angle of the automobile includes: a sensor of a bridge configuration mounted in the automobile for sensing the angle of inclination of the automobile; a differential amplifier for amplifying the output of the sensor; an offset compensating circuit which produces a reference voltage for the differential amplifier by comparing the output of the differential amplifier with a constant value and by then integrating the differential output; an alarm device for issuing an alarm when the output of the differential amplifier exceeds a predetermined value; and a switching device for increasing a time constant for making the total integration time constant for the offset compensating circuit larger than the time constant of the integrating elements thereof by intermittently supplying the output of the differential amplifier to the offset compensating circuit. The integration time constant of the offset compensating circuit which supplies the reference voltage to the differential amplifier for amplifying the output of the sensor can be set at a required value even when using a small-capacitance capacitor.

14 Claims, 16 Drawing Sheets

Fig.3(a)
Fig.3(b)
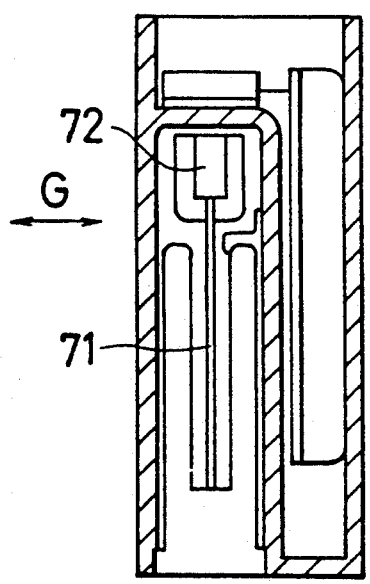
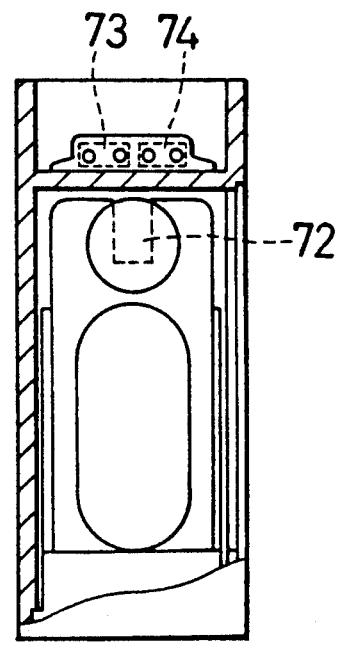

INCLINATION ANGLE DETECTION APPARATUS AND AUTOMOBILE THEFT ALARM APPARATUS USING THE SAME

BACKGROUND OF THE INVENTION

1. Field of the Invention

The present invention relates to an inclination angle detection apparatus and an automobile theft alarm apparatus using the same based on detecting the variation of the inclination angle of the automobile.

2. Description of the Prior Art

The stealing of tires from a parked automobile by jacking up the automobile or a theft of the automobile itself by using a wrecker can be sensed by monitoring the variation of the angle of inclination of the automobile. The inclination angle itself of the automobile can be easily sensed using an acceleration (G) sensor or other inclination sensing means, but in the case of detecting the variation of the inclination angle, the inclination angle when the automobile was parked must be referenced.

An inclination variation detecting means using direct currents stores the initial inclination angle of the automobile when the automobile was parked so that the variation of the inclination angle at any particular point of time is obtained by comparing the initial angle with the inclination angle at that particular point of time. Therefore, a memory for storing the initial inclination angle is required.

On the other hand, an inclination variation detecting means using alternating-currents obtains the variation of the inclination angle by differentiating the output of an inclination sensing means, and therefore, the above-said memory is not required.

An example of an apparatus for detecting the variation of the inclination angle of the automobile using alternating-currents is disclosed in Japanese Patent Publication No. 63-255664. The apparatus is shown in FIGS. 1(a)–1(b), wherein the numeral 111 designates an acceleration sensor mounted in the automobile, element 112 is a constant current circuit, and element 113 is a differential amplifier, which combine to constitute an inclination sensing means 110. The element 120 is an HPF (high-pass-filter) for obtaining only the amount of variation of the inclination angle from the output of the inclination sensing means 110, and element 131 is an AC amplifier for amplifying the output of the HPF 120.

The differential amplifier 113 for amplifying an output of the acceleration sensor 111 consists of two stages of operational amplifiers a1 and a2. The HPF 120 is used to extract only the alternating-current component (the amount of variation of the inclination angle) from the output of the inclination sensing means 110. In theory, it may consists only of a coupling capacitor ca, but in this example, a resistor ra is inserted to provide a high-pass characteristic. The AC amplifier for amplifying the output of the HPF 120 consists of an operational amplifier a3.

When the constant current I is 5 mA, the sensitivity of the acceleration sensor 111 is approximately 1.35 mV/0.5 G. G is the acceleration of free fall, and 0.5 G is equivalent to the inclination of 30 degrees. The qualification of resolution required for sensing the theft of the automobile is as small as 3 degree in terms of the detection angle, which is about 0.0523 G in the acceleration of free fall. Therefore, supposing the threshold value of the rear stage circuit is 0.5 V, the required total gain of the amplifiers 113 and 131 is:

$$0.5(V)/\{[1.35(mV) \times 0.0523(G)]/0.5(G)\} = 3540 \text{(times)}$$

Also, in order to sense a slow jacking-up action, e.g., an inclination of 3 degrees over 30 seconds, the HPF 120 is required to have a cut-off frequency of 0.0016 Hz, which means very large time constants of ca and ra.

Large time constants of ca and ra, as mentioned above, will present difficulty in the selection of the capacitor ca. That is, using a large-capacitance film capacitor as the capacitor ca will result in an increase not only in size but also in cost. On the other hand, using an electrolytic capacitor as the capacitor ca will involve the problem of causing an offset because of leakage current. For example, even if a leakage current as small as 0.6 µA flows in the 1MΩ resistor ra, it will generate an offset voltage of 0.6 V, which is enough to erroneously activate an alarm means having a threshold value of 0.4 to 0.5 V.

SUMMARY OF THE INVENTION

Accordingly, it is a primary object of the invention to provide a novel, improved an inclination angle detection apparatus and an automobile theft alarm apparatus using the same to solve the above problems.

It is another object of the invention to provide an inclination angle detection apparatus that allows the setting of a required time constant even in the case of a small-capacitance capacitor and a theft alarm apparatus using such a detection apparatus.

To achieve the above objects, the invention provides an inclination angle detection apparatus comprising:

a sensor for sensing the angle of inclination;

a differential amplifier for amplifying an output of the sensor;

an offset compensating circuit which supplies a reference voltage to an input terminal of the differential amplifier by comparing an output of the differential amplifier with a constant value and integrating a differential output resulting from subtraction between the output of the differential amplifier and the constant value;

a switching means to increase a time constant for increasing the total integration time constant of the offset compensating so as to be greater than the time constant of integrating elements (C,R) thereof by intermittently supplying the output of the differential amplifier to the offset compensating circuit; and a means for detecting the angle of inclination in response to the output of the differential amplifier.

In a preferred embodiment, the apparatus is mounted to an automobile, and provided with an initializing means for initializing integrating elements of the offset compensating circuit when the automobile is parked.

In a different preferred embodiment, the initializing means continually turns on the switching means.

In a still different preferred embodiment, the total integration time constant of the offset compensating circuit is varied by varying the on/off duty ratio of the switching means.

In a further different preferred embodiment, the apparatus comprises a low-pass-filter for eliminating external vibrations by removing low frequency components from the output of the differential amplifier.

In a further more different preferred embodiment, the apparatus comprises a switching means for intermittently the inclination sensor.

In a still further different preferred embodiment, the apparatus has two constructions comprising the inclination sensor, the differential amplifier, the offset compensating circuit, the switching means and the detection means and detects inclinations in both the width direction and the longitudinal direction.

Furthermore, the invention provides an automobile theft alarm apparatus comprising:

a sensor mounted to the automobile for sensing the angle of inclination;

a differential amplifier for amplifying an output of the sensor;

an offset compensating circuit which supplies a reference voltage to an input terminal of the differential amplifier by comparing an output of the differential amplifier with a constant value and integrating a differential output resulting from subtraction between the output of the differential amplifier and the constant value;

a switching means to increase a time constant for increasing the total integration time constant of the offset compensating circuit so as to be greater than the time constant of integrating elements (C,R) thereof by intermittently supplying the output of the differential amplifier to the offset compensating circuit; and an alarm means for issuing an alarm when the output of the differential amplifier exceeds a predetermined value.

In a still furthermore different preferred embodiment, the apparatus is provided with an initializing means for initializing integrating elements of the offset compensating circuit when the automobile is parked.

As described, since there is no need to use an electrolytic capacitor in the offset compensating circuit of the theft alarm apparatus for automobile using alternating-currents inclination variation detecting means, the invention has the advantage that the possibility of current leakage, hence the effect thereof, is reduced. Also, since the integrating circuit can be initialized using the time constant increasing switch S1, there is no need to provide a separate reset switch. Furthermore, the invention has the advantage of flexibility of system configuration since the total integration time constant can be changed by simply changing the drive duty cycle of the time constant increasing switch S1.

BRIEF DESCRIPTION OF THE DRAWINGS

Other and further objects, features, and advantages of the invention will be more explicit from the following detailed description taken with reference to the drawings wherein:

FIGS. 3(a)-3(b) are diagrams showing the construction of one example of an acceleration sensor;

DETAILED DESCRIPTION OF THE PREFERRED EMBODIMENTS

Figure 1A:
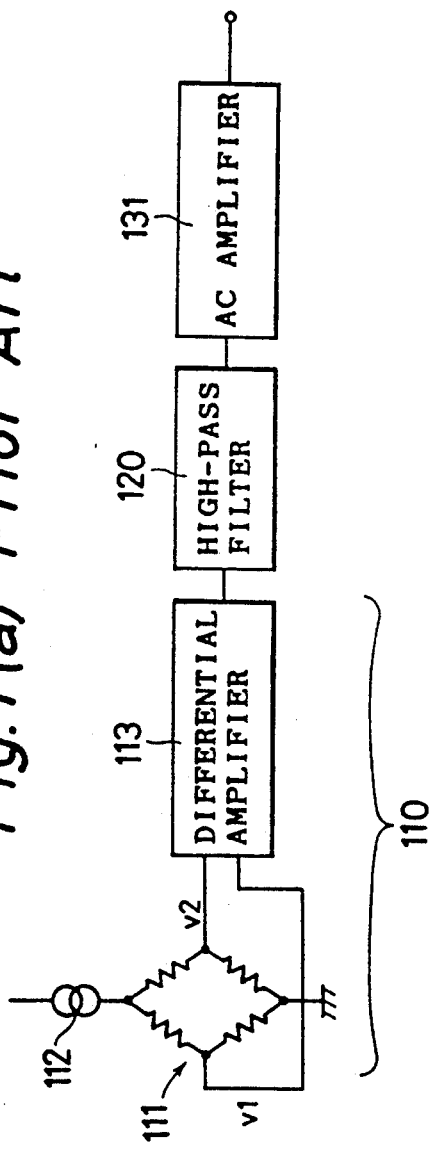
FIGS. 1(a)-1(b) are block and schematic diagrams of one example of a prior art inclination variation detecting apparatus.

Now referring to the drawing, preferred embodiments of the invention are described below.

Figure 2:
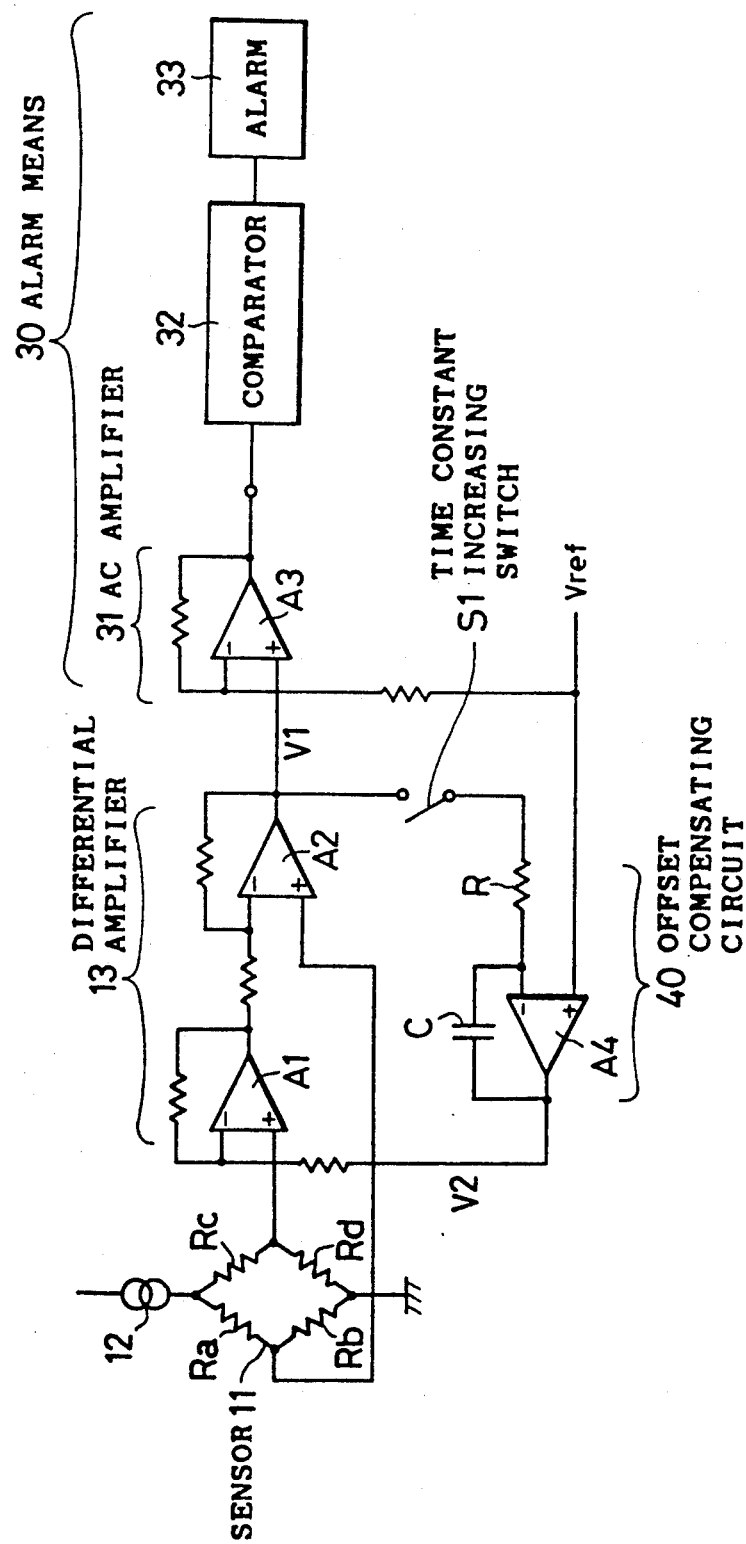
FIG. 2 is a diagram illustrating the principle construction of the invention.

FIG. 2 is a diagram showing the operating principle of the invention, wherein the numeral 11 designates an inclination angle sensor of bridge configuration; element 12 is a constant current source; element 13 is a differential amplifier for amplifying the output of the sensor; element 30 is an alarm means including an AC amplifier 31, a comparator 32, and an alarm 33; element 40 is an offset compensating circuit; and S1 a time constant increasing switch.

The acceleration sensor 11 can be constructed in various ways. FIGS. 3(a)-3(b) show the construction of one example of the acceleration sensor 11, in which a permanent magnet 72 is fixed to the tip of a slidable support rod 71 and the displacement of the magnet 72 by acceleration G is detected by opposite-polarity magnetic detection elements 73 and 74 (Hall effect elements, magnetic resistance elements, etc.) to detect the acceleration G. In this construction, the outputs of the two magnetic detection elements 73 and 74 are input to the differential amplifying circuit and the difference between the inputs is taken to offset the characteristic varaition between the elements.

Figure 4A:
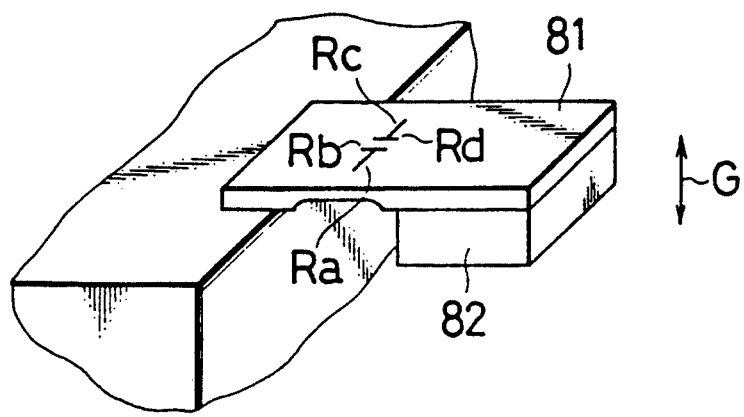
FIGS. 4(a)-4(b) are diagrams showing the construction of another example of an acceleration sensor.
Figure 4B:
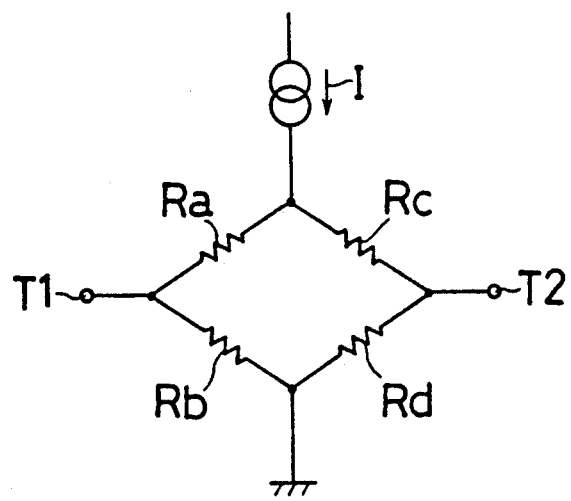

FIGS. 4(a)-4(b) show the construction of another example of the acceleration sensor 11. The acceleration sensor of this example is constructed with a four-arm bridge of diffused resistors Ra to Rd formed on an elastic semicondutor substrate 81 one end of which is fixed and the other end of which is attached with a weight 82. This example utilizes the phenomenon that when stress is applied to the substrate 81 by acceleration G, the values of the resistors Ra to Rd vary because of the piezoelectric effect. The change in the resistance values can be detected as a voltage appearing between two output terminals T1 and T2 when a constant current is fed therethrough.

In the apparatus of FIG. 2, the acceleration sensor of FIGS. 4(a)-4(b) is used, but the sensor of FIG. 3(a)-3(b) can be expressed by the same equivalent circuit.

The sensor 11 produces an output corresponding to the inclination angle of an automobile, and the output is amplified by the differential amplifier 13. The alarm means 30 further amplifies the differential-amplified output V1 using the amplifier 31 and issues an alarm when the amplified output exceeds the threshold value of the comparator 32.

Figure 1B:
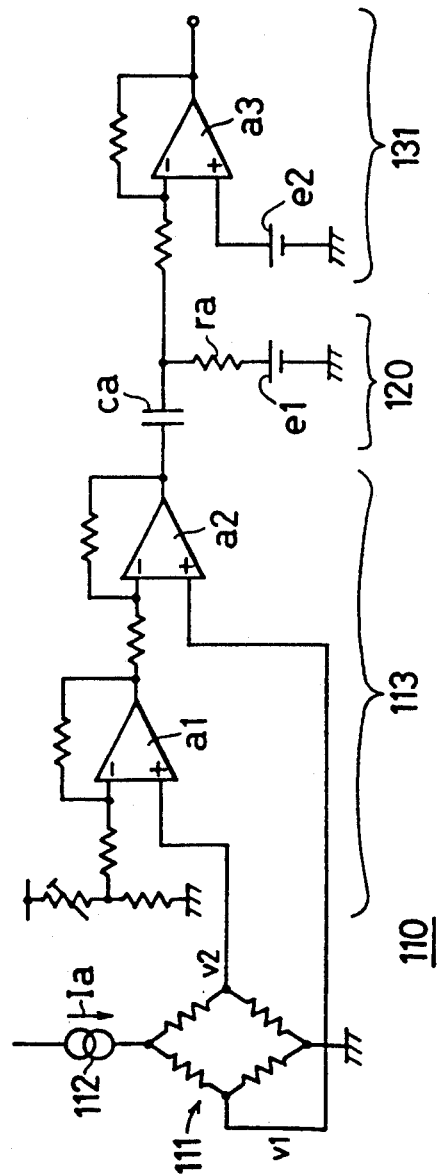

In this invention, the HPF 120 previously shown in FIG. 1 is not inserted between the differential amplifier 13 and the AC amplifier 31. Instead, the offset compensating circuit 40 is provided which holds the output V1 of the differential amplifier 13 at a constant value Vref so that only the amount of variation of the inclination angle is transferred to the AC amplifier 31, as in the case of the HPF 120.

To describe in detail, the offset compensating circuit 40 uses a comparator A4 which obtains the difference between the output of the differential amplifier 13 and the constant value Vref, and the differential output V2 is used as the reference voltage for the first stage operational amplifier A1 of the differential amplifier 13. As a result, the output V1 of the differential amplifier 13 always tries to converge on the constant value Vref. However, with the comparator A4 only, the signal component would also be suppressed. Therefore, an integrating circuit consisting of a capacitor C and a resistor R is included to provide negative feedback for the low-frequency component only. With such consturction, since the high-frequency component, which is not negative feedback to the differential amplifier 13 by the offset compensating circuit 40, is transferred to the AC amplifier 31, the same transfer characteristic as that of the HPF 120 can be obtained by selecting the time constant CR of the integrating circuit.

Furthermore, the negative feedback of the low-frequency component serves to remove the offset or drift of the sensor 11 and the differential amplifier 13 and also to absorb the offset caused by leakage current from the capacitor C. It should be noted, however, that the leakage current should be suppressed so as to be as low a level as possible. Accordingly, in the invention, the switch S1 is intermittently turned on and off so as to intermittently supply the output V1 of the differential amplifier 13 to the offset compensating circuit 40. In this way, the apparent total integration time constant of the compensating circuit becomes larger than the time constant of the integrating elements C and R. This allows the use of a small-capacitance capacitor for the capacitor C, therefore, a small-size film capacitor with reduced leakage characteristic can be used.

Figure 5:
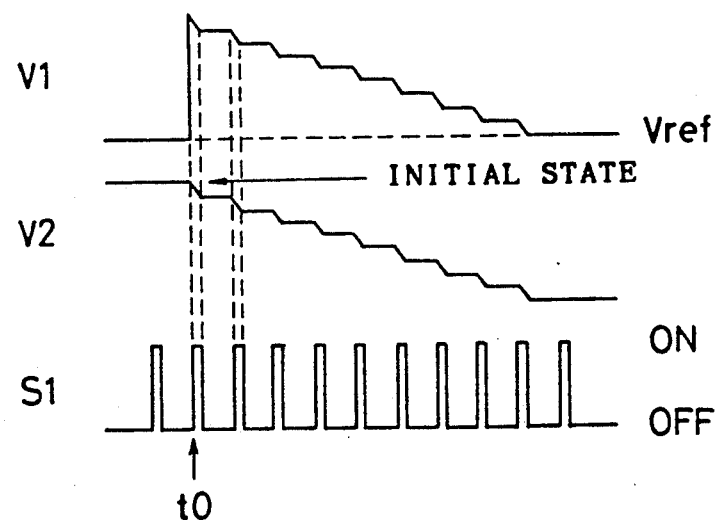
FIG. 5 is a diagram showing the operating waveform of FIG. 2.

FIG. 5 shows the operating waveform of the invention. Suppose that the differential-amplified output V1 abruptly rises from the constant value Vref at time t0 because of variation in the output of the sensor 11 or occurrence of an offset in the differential amplifier 13. At this point of time, the integrated output V2 begins to drop in such a way as to bring the differential-amplified output V1 back to the constant value Vref. Since the switch S1 cycles between on and off at a constant frequency (for example, at 1 Hz), the capacitor C can be actually charged and discharged only during the on period of the switch S1. During the on period, the voltage of the integrated output V2 decreases at the time constant CR of the integrating circuit. During the off period of the switch S1, on the other hand, the charge on the capacitor C remains unchanged. Therefore, because of the intermittent operation of the switch S1, the capacitor C discharges at the total time constant which is a product of the time constant CR of the elements multiplied by the reciprocal of the on/off time ratio of the switch S1.

For example, when the on period of the switch S1 is 10 msec and the off period is 1 second (the on/off ratio is 1/100), since the total time constant is 100 times CR, the required total time constant can be accomplished even with $C = 1 \mu F$ when $R = 1 M\Omega$. Since such a small capacitance as 1 uF can be sufficiently provided even by a small-sized film capacitor, reduction in the leakage current and in the size of the capacitor C can be achieved.

Figure 6:
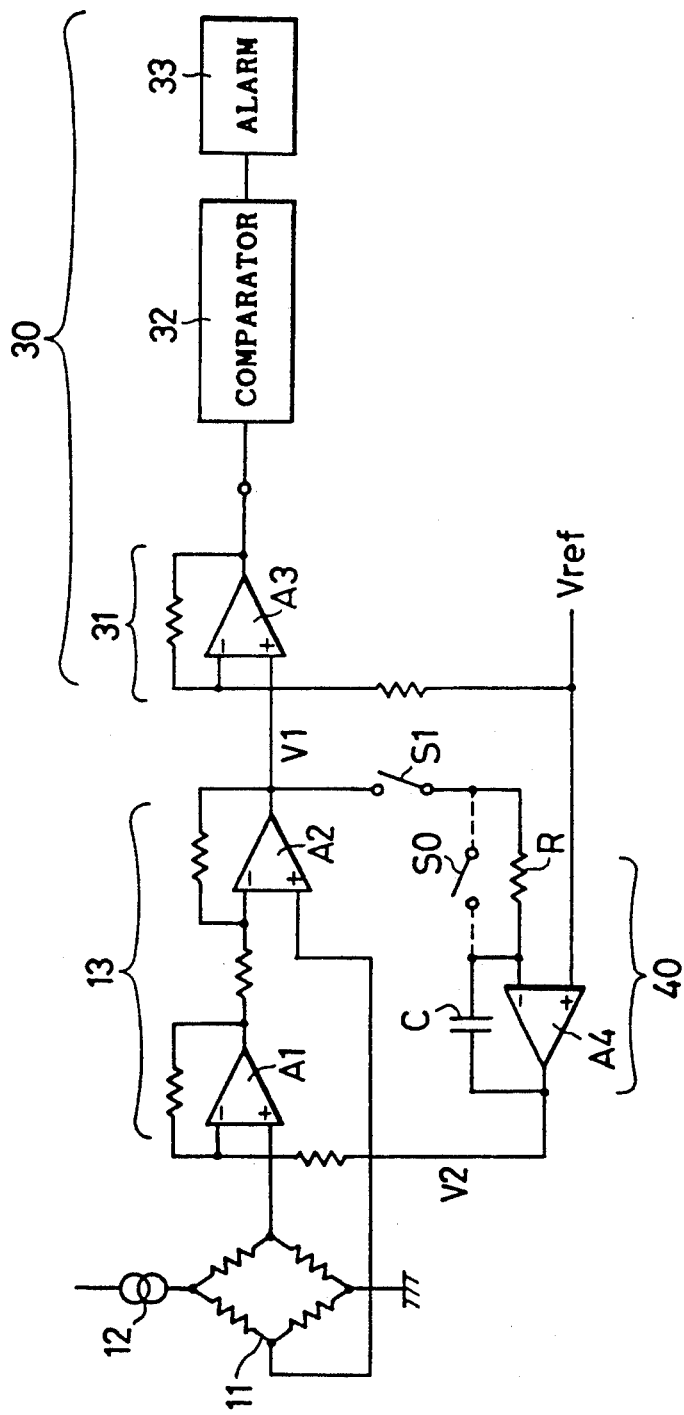
FIG. 6 is a block diagram of a first embodiment of the present invention.
Figure 7:
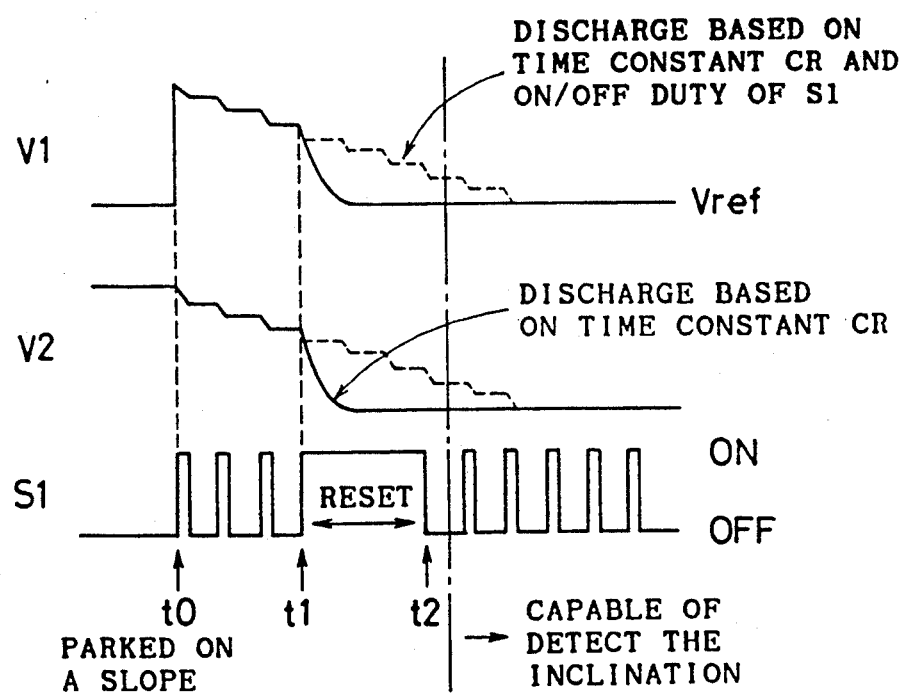
FIG. 7 is a diagram showing the operating waveforms of FIG. 6.

FIG. 6 is a block diagram of a first embodiment of the invention, and FIG. 7 is a diagram showing the operating waveform of the same. The construction of this embodiment is apparently identical to that of FIG. 2, with the difference that the switch S1 for increasing the time constant is provided with a reset function.

That is, when the automobile is parked on a slope, the differential-amplified output V1 abruptly rises at time t0 as shown in FIG. 7, and it takes time before the output returns to the constant vaule Vref. As a result, if the apparatus is set to the theft monitoring mode before that, the alarm may be erroneously activated because of the persistence of the differential-amplified output V1. Therefore, in this embodiment, the switch S1 is temporarily energized for a continuous period of time (from time t1 to time t2) immediately after the parking of the automobile, during which period the differential-amplified output V1 is quickly brought back to Vref using only the time constant CR of the integrating circuit, thereby enabling the setting of the normal theft monitoring mode.

The reset action (initialization) may be achieved instantaneously by shorting out the resistor R using a separate switch S0, but this would not only increase the number of switches but also result in the complexity of control.

Figure 8:
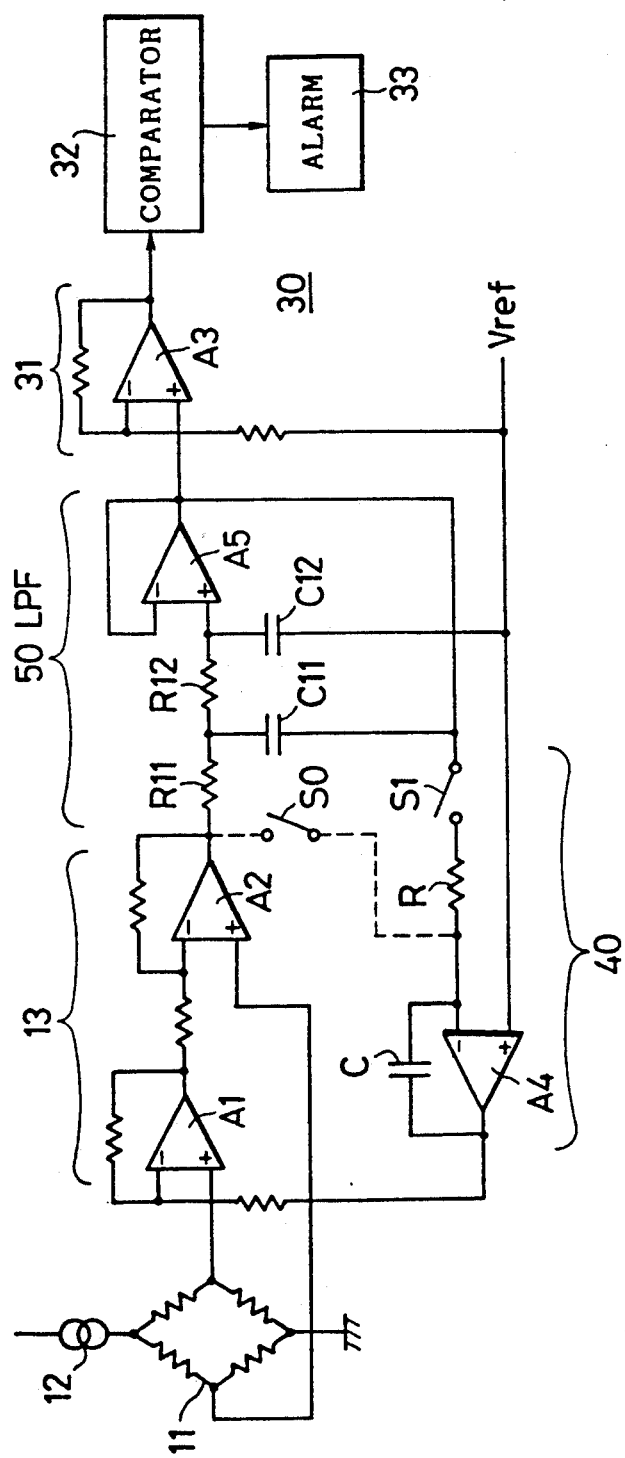
FIG. 8 is a block diagram of a second embodiment of the present invention.

FIG. 8 is a block diagram of a second embodiment of the present invention. The construction of this embodiment is identical to that of FIG. 6, except that a LPF (low-pass filter) 50 is added. The LPF 50 consists of resistors R11 and R12, capacitors C11 and C12, and an operational amplifier A5, and is intended to remove vibration of about 2 Hz externally applied to the automobile when the automobile is parked on a bridge or when other automobiles pass by the parked automobile. Therefore, when, for example, frequencies above 2 Hz are cut off by the LPF 50 and frequencies below 0.001 Hz are cut off by the HPF function of the offset compensating circuit 40, the result is a BPF (band-pass filter) having a passband of 0.001 Hz to 2 Hz for transmission from the differential amplifier 13 to the amplifier 31.

It may be so configured that the input of the offset compensating circuit 40, i.e. the connection point of the switch S1, is the output of the differential amplifier 13, but as shown in this embodiment, it may be branched from the output of the LPF 50. The advantage of this method will be described later in connection with another embodiment (intermittent driving method) shown in FIG. 10. If the initialization switch S0 is to be used, the switch S0 should be connected between the output end of the differential amplifier 13 and the inverted input of the comparator A4.

Figure 9:
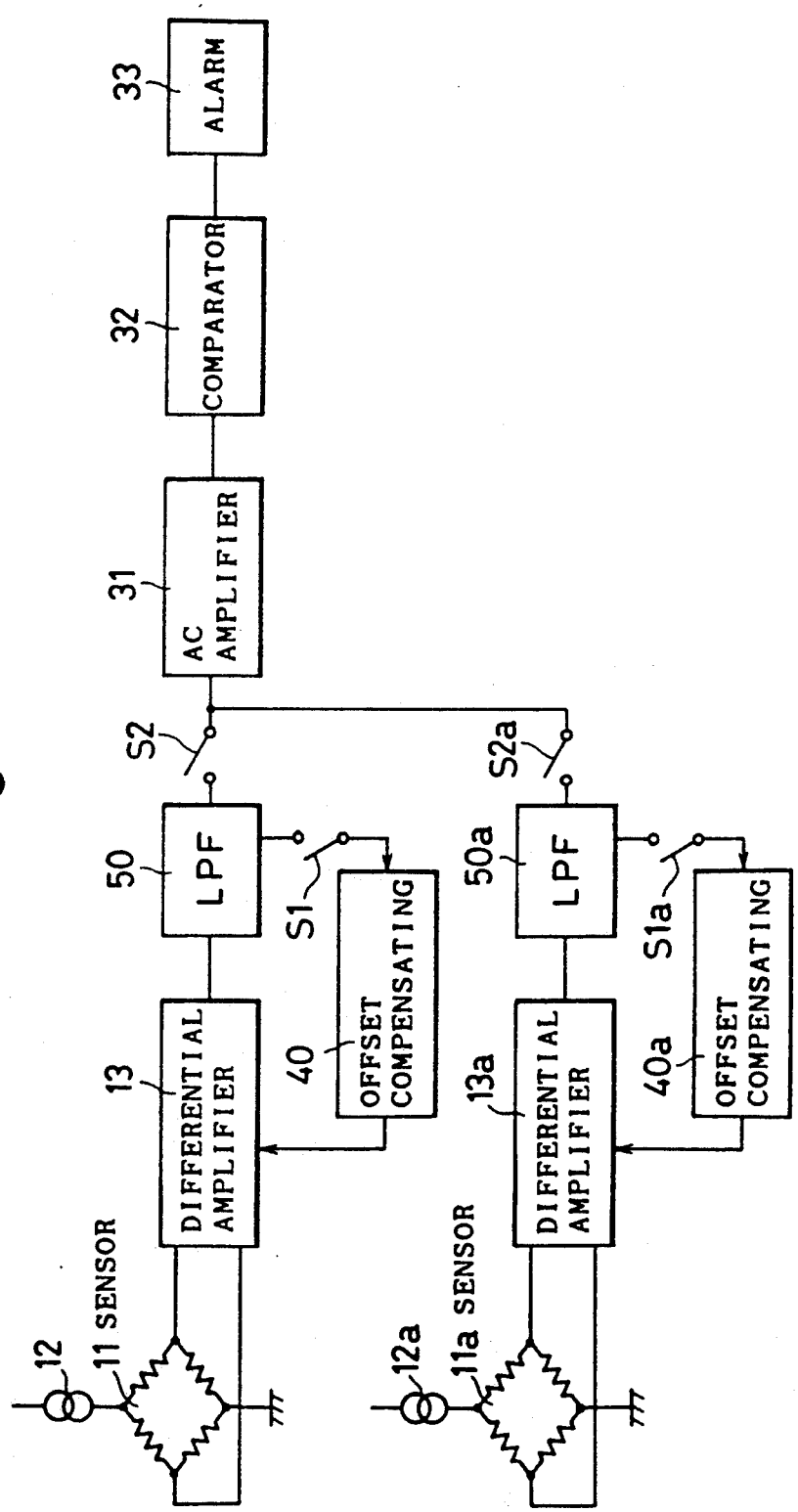
FIG. 9 is a block diagram of a third embodiment of the present invention.

FIG. 9 is a block diagram of a third embodiment of the present invention. In this embodiment, selector switches S2 and S2a are provided so that the same alarm means 30 can be used when using two sensors 11 and 11a each being provided for detecting the inclination in one direction intersecting at right angles to the other. The numerals 11a, 12a, 13a, 40a, 50a, and S1a indicate circuits having the same functions as those indicated by the numerals 11, 12, 13, 40, 50, and S1, respectively.

Figure 10:
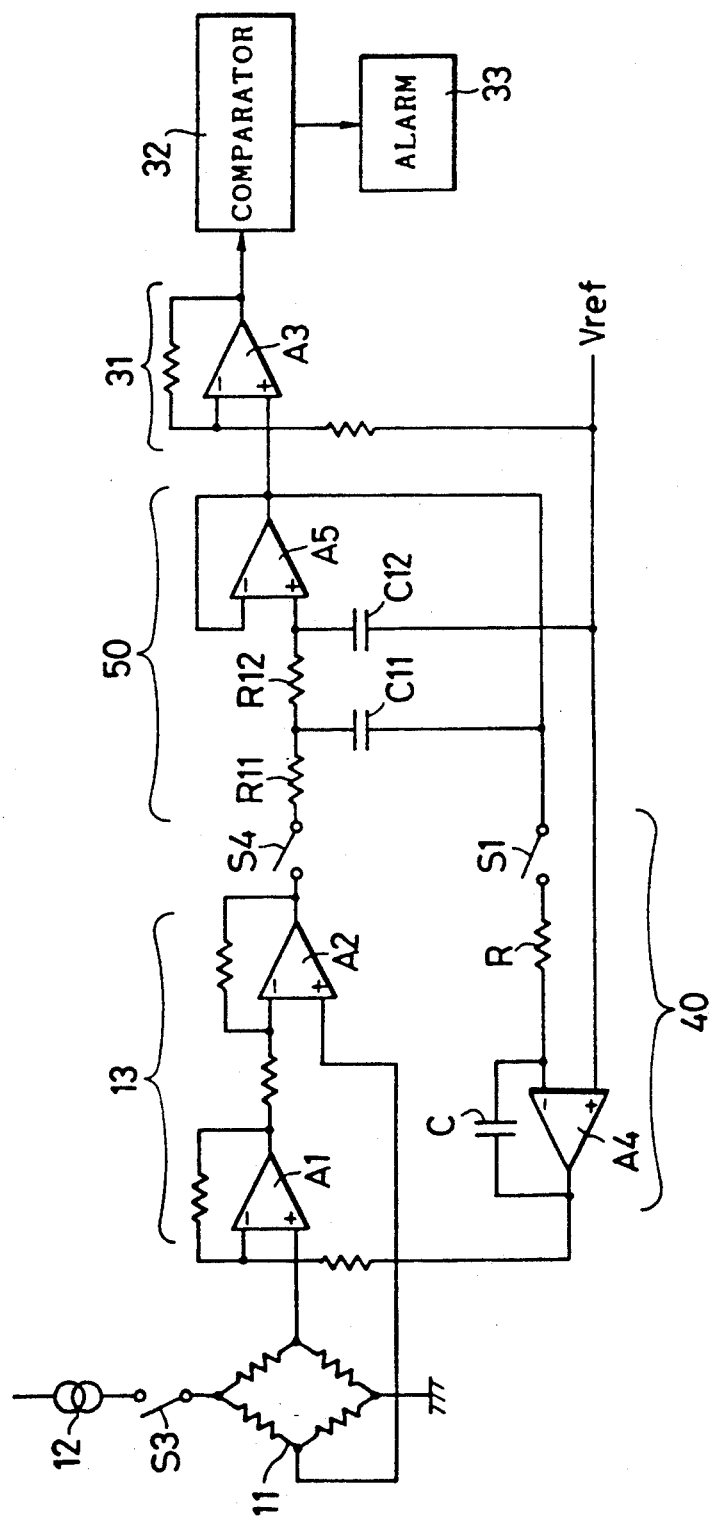
FIG. 10 is a block diagram of a fourth embodiment of the present invention.

FIG. 10 is a block diagram of a fourth embodiment of the present invention. The construction of this embodiment is identical to that of FIG. 8, except that an intermittent driving switch S3 and an LPF output holding switch S4 are added.

Figure 11:
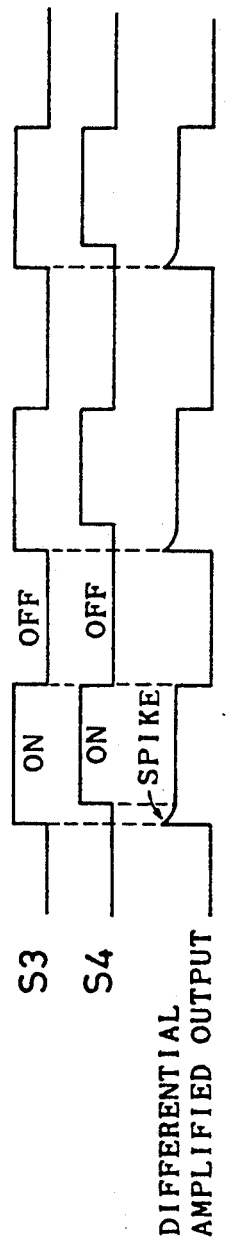
FIG. 11 is a diagram showing the operating waveforms of FIG. 10.

The switch S3 is turned on and off at a constant cycle, as shown in FIG. 11, allowing current to be fed to the sensor 11 only during the on period and thus reducing power dissipation. When current is fed, the sensor produces an output, and when no current is fed, the output is zero. When viewed from the differential amplifier 13, the variation of the sensor output by the switch S3 is nothing but a usual signal variation.

Therefore, when the differential-amplified output during the off period of the switch S3 is applied to the LPF 50, the LPF output will vary in response to the on/off operation of the switch S3. Accordingly, the switch S4 is turned on and off in synchronism with the operation of the switch S3, to hold the output of the LPF 50. However, when the switch S3 is turned from off to on, a "spike" appears in the differential-amplified output, as shown in FIG. 11. Therefore, the time to turn on the switch S4 should be slightly delayed from the activation of the switch S3 so that the spike can be cut off.

When the switch S3 is turned off, the output of the sensor 11 drops to zero. At this time, when the input of the offset compensating circuit 40 is the output of the differential amplifier 13, as shown in FIG. 6, the offset compensating circuit 40 acts to vary the reference voltage in such a way as to offset the output variation (falling) of the differential amplifier 13. Therefore, when the switch S3 is turned on, the output of the differential amplifier does not immediately rises to Vref. Accordingly, the input of the offset compensating circuit 40 is taken from the output of the LPF 50, as shown in FIG. 9. With this arrangement, the output of the LPF 50 is held at Vref during the off period of the switch S4 which includes the off period of the switch S3, and therefore, the reference voltage for the differential amplifier 13 remains unchanged. Also, it may be so configured that the input of the LPF 50 passed through the switch S4 is supplied to the offset compensating circuit 40.

Figure 12:
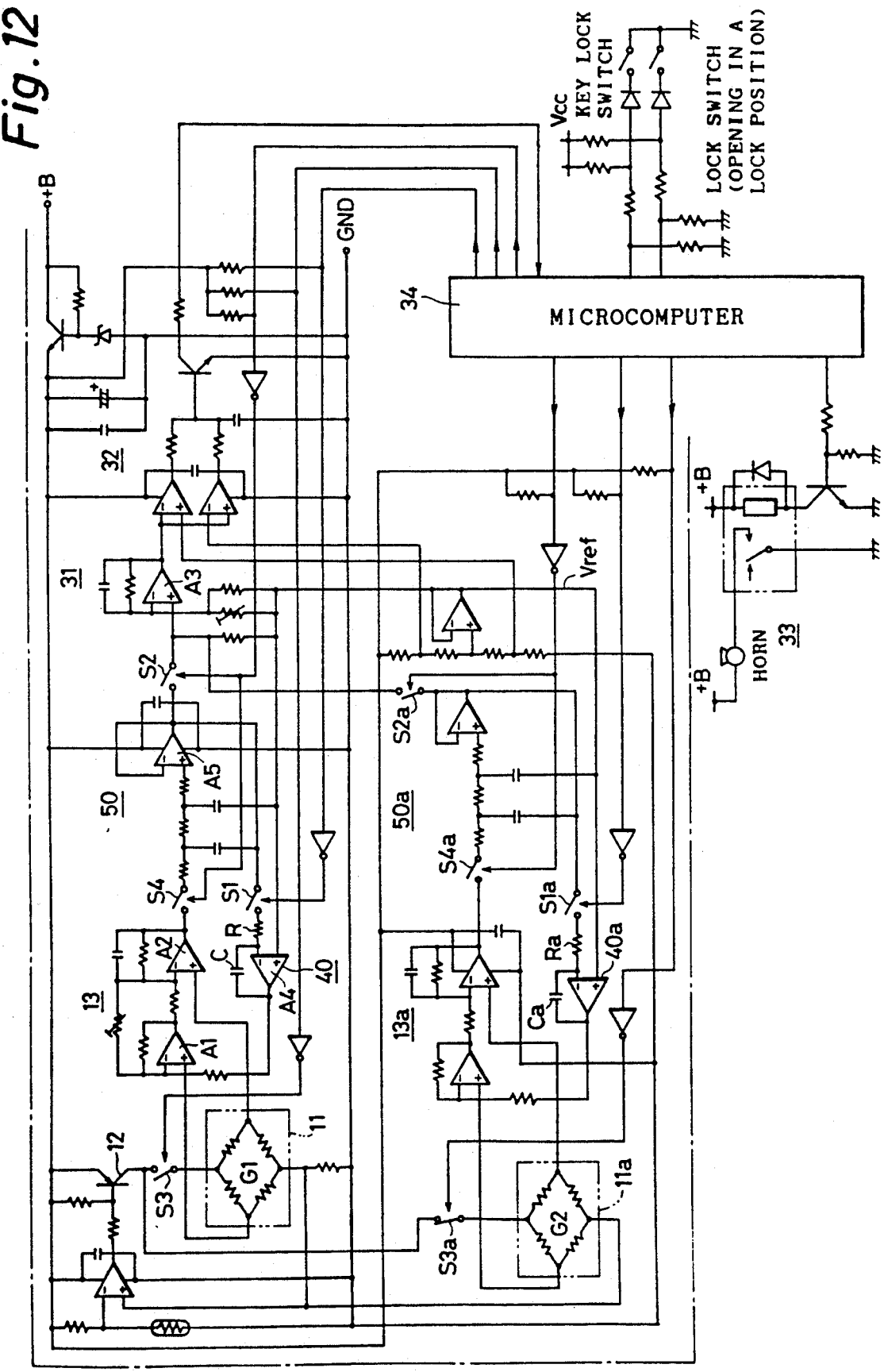
FIG. 12 is a block diagram of a fifth embodiment of the present invention.
Figure 13:
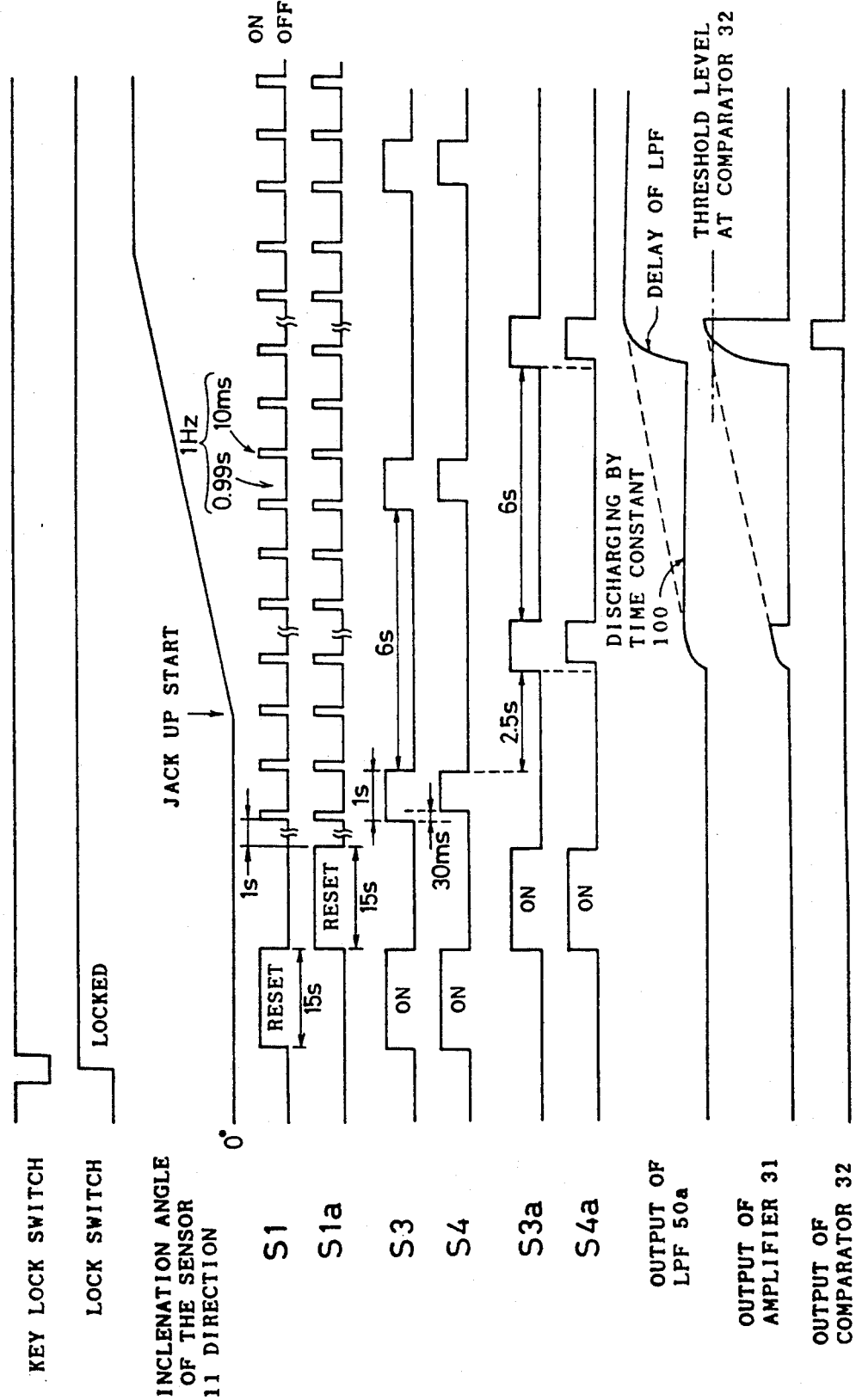
FIG. 13 is a diagram showing the operating waveforms of FIG. 12.

FIG. 12 shows a fifth embodiment of the present invention in which all the foregoing embodiments are combined. This embodiment uses two sensors 11 and 11a to detect the inclinations in directions intersecting at right angles to each other. Intermittent driving switches S3 and S3a are used to alternately feed current to the sensors 11 and 11a from a common constant current source 12. FIG. 13 shows the timing. The output holding switches S4 and S4a of LPFs 50 and 50a are synchronized with the operations of the switches S3 and S3a.

Time constant increasing switches S1 and S1a, which also serve as reset switches, are enabled for reset operation when the lock switch is set in a lock position, but the reset-on timing is shifted from each other as shown in FIG. 13. This is to match the operations of the switches S3 and S3a. After the resetting is completed, the switches S1 and S1a proceed to the time constant increasing operation cycling between on and off. The on/off operation is synchronized shown in FIG. 13. Selector switches S2 and S2a are operated in synchronism with the switches S4 and S4a. Control of these switches are performed by a microcomputer 34. The microcomputer 34 also performs processing to drive a horn 33 when an alarm output is received from a comparator 32.

Figure 14A:
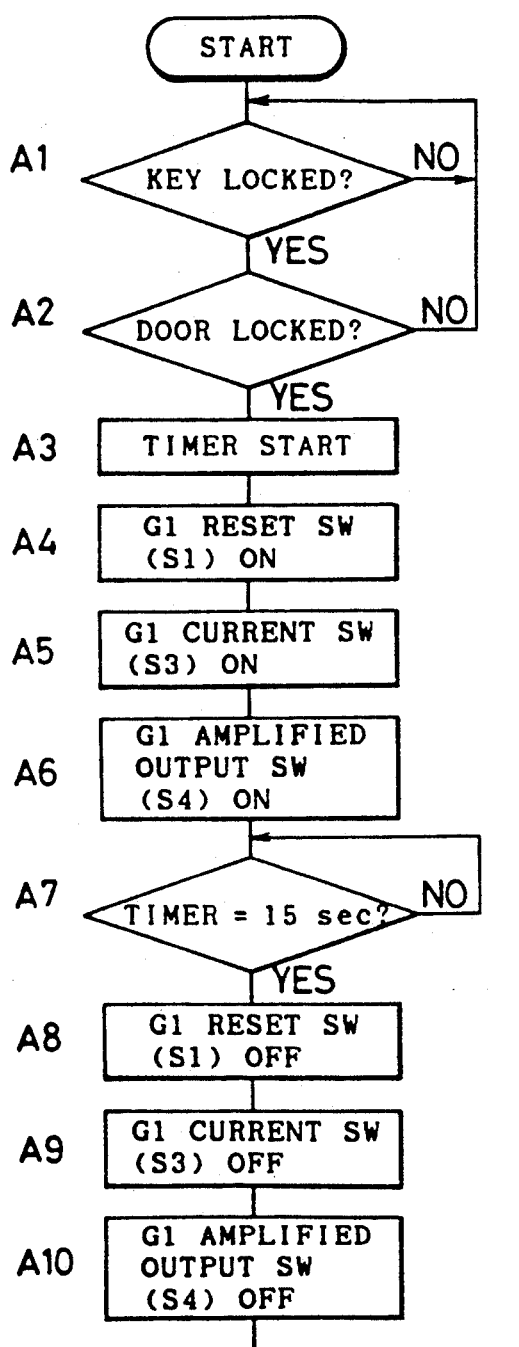
FIGS. 14(a)-14(c) together form a flowchart showing microcomputer processing.
Figure 14A:
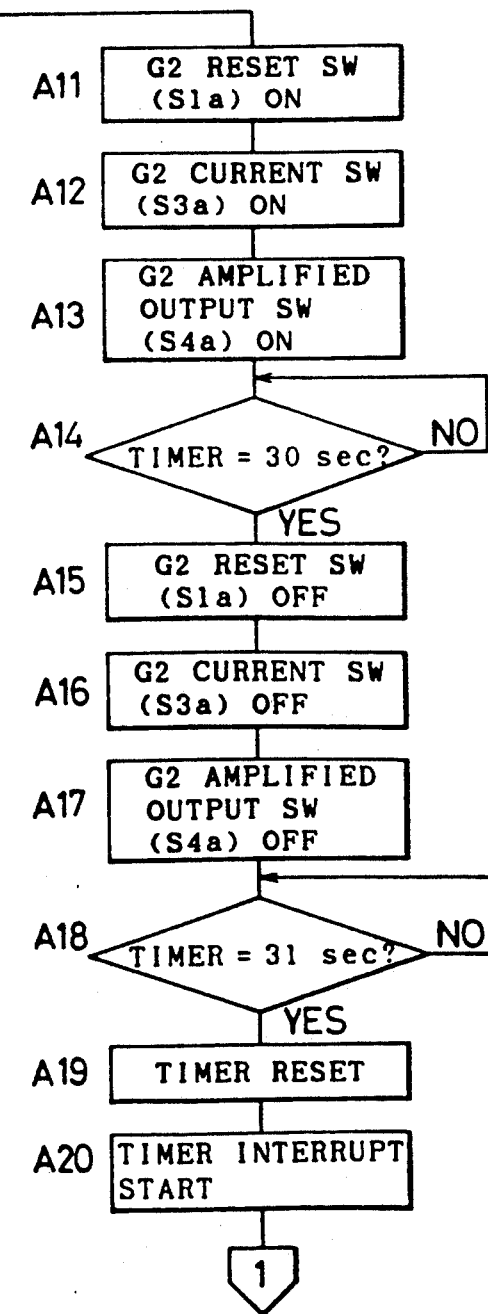
Figure 14B:
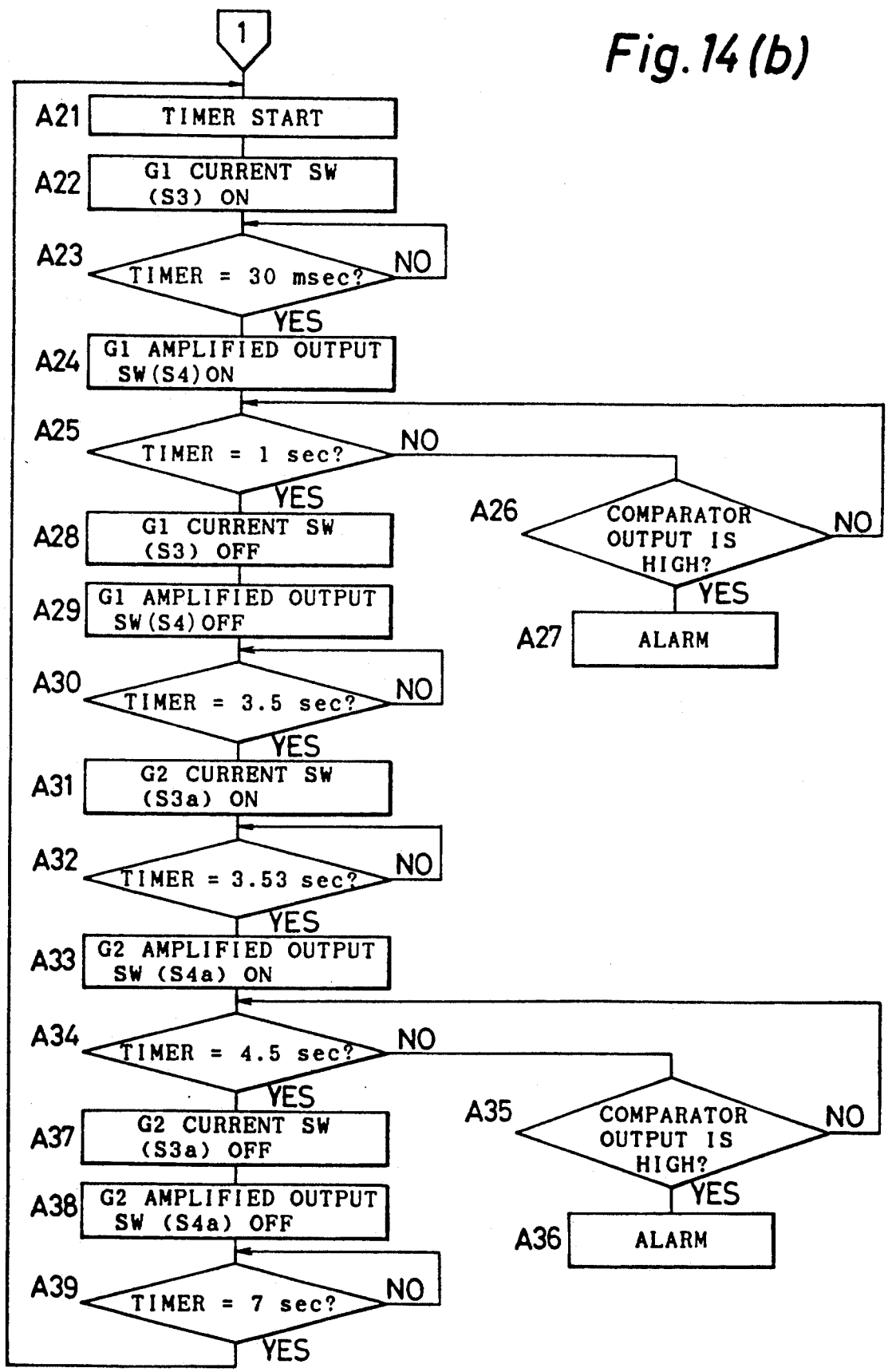
Figure 14:
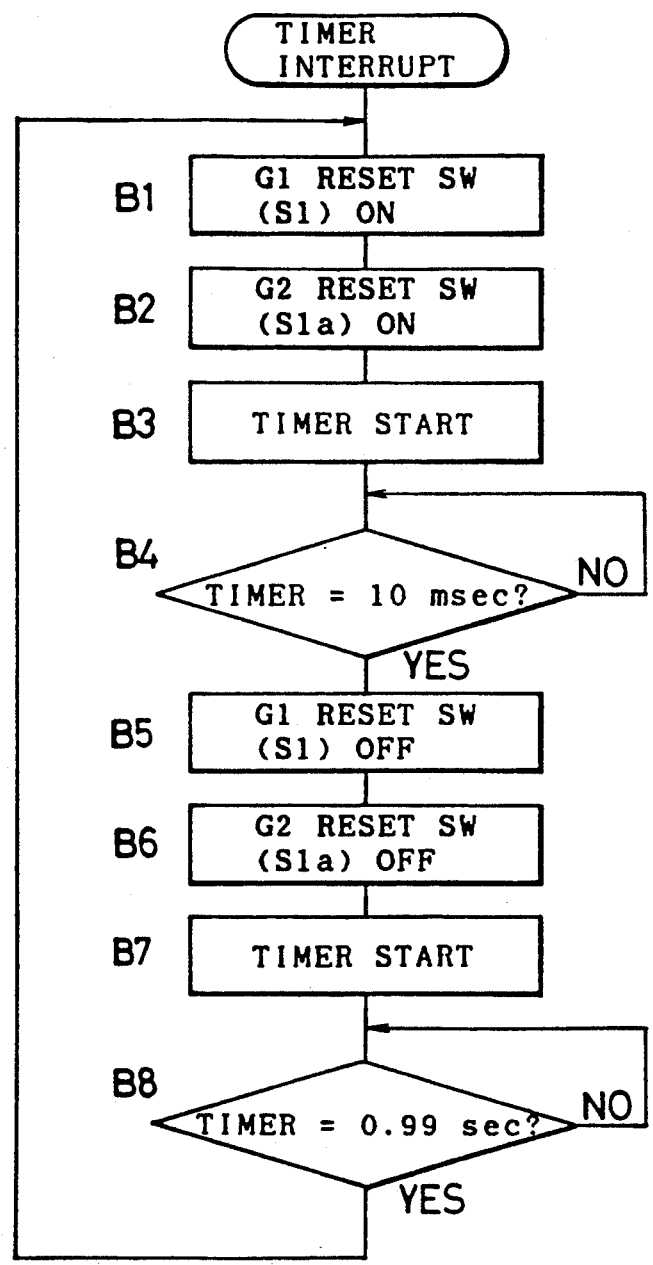

FIGS. 14(a)-14(c) together form a flowchart illustrating the processing by the microcomputer 34. In the flowchart, the sensors 11 and 11a shown in FIG. 12 are respectively denoted as G1 and G2, the switches S1 and S1a as reset switches, S3 and S3a as current switches, and S4 and S4a as amplifier output switches. FIGS. 14(a) and 14(b) show the main routine, FIG. 14(a) illustrating the processing steps for resetting the offset compensating circuits 40 and 40a, FIG. 14(b) the processing steps for intermittent energization of the sensors G1 and G2. FIG. 14(c) shows a 1 second interrupt handling routine for increasing the time constant of the offset compensating circuits 40 and 40a. All these steps are performed matching the timing chart of FIG. 13.

First, we will describe the processing shown in FIG. 14(a). In the first step A1, the key lock SW is monitored, and when this switch is turned on, the process proceeds to the next step A2 in which the state of the door lock SW is examined. When the door lock SW is in the locked state, it can be presumed that the automobile is parked with the door closed and locked from outside the automobile. Therefore, in the next step A3, the timer is started to start the resetting of the offset compensating circuit 40 for the sensor G1. That is, in steps A4 to A6, the switches S1, S3, and S4 are turned on, and in step A7, a determination is made as to whether or not 15 seconds has passed. When the 15 seconds has passed, which means the resetting of the offset compensating circuit 40 for G1 is completed, the switches S1, S3, and S4 are set back to the off position in steps A8 to A10.

Next, in steps A11 to A13, the switches S1a, S3a, and S4a are turned on to perform the resetting of the offset compensating circuit 40a for the sensor G2. In this case also, the time required for resetting is 15 seconds, but since the timer has kept on counting, a determination is made in step A14 as to whether or not 30 seconds have passed from step A3. When the 30 seconds has passed, which means the resetting of the offset compensating circuit 40a for G2 is completed, the switches S1a, S3a, and S4a are turned off in steps A15 to A17.

Thereafter, in step A18, a determination is made as to whether or not the timer has counted 31 seconds from step A3, i.e., one second from step A14, to prepare for the intermittent energization processing shown in FIG. 14(b) and the time constant increasing processing shown in FIG. 14(c). That is, when 31 seconds has passed, the timer is reset in step A19 to prepare for the intermittent energization processing shown in FIG. 14(b), while in step A20 the timer interrupt shown in FIG. 14(c) is started. The timer used in the timer interrupt of FIG. 14(c) is a different timer from the one used in the processing of FIG. 14(a) or FIG. 14(b).

In the intermittent energization processing of FIG. 14(b), the timer is started in step A21, which is followed by step 22 in which the reset switch S3 is turned on to energize G1. Next, in step A23, a determination is made as to whether or not 30 msec has passed, after which in step A24 the amplifier output switch S4 is turned on. The G1 side is now put on alert, which is continued for 1 second in step A25. During this period, in step A26, the output of the comparator 32 is examined, and if the output is high, a theft alarm is issued in step A27. This alarm continues until the system reset is performed.

On the other hand, when 1 second has passed without anything happening, the switches S3 and S4 are turned off in steps A28 and A29. Then, in step A30, a determination is made as to whether or not 3.5 seconds has passed from step A21 (2.5 seconds from step A25), after which in step A31 the switch S3a is turned on to energize G2. In 30 msec thereafter, when it has been determined in step A32 that 3.53 seconds has passed, the process proceeds to step A33 in which the switch S4a is turned on to put the G2 side on alert, which is continued for 1 second until it is determined in step A34 that 4.5 seconds has passed. During this 1 second period, in step A35, the output of the comparator 32 is examined. If the output is high, the theft alarm is issued in step A36. This procedure is the same as in step A27. On the other hand, when 1 second has passed without anything happening, the switches S3a and S4a are turned off in steps A37 and A38, thus completing one cycle of detection by G1 and G2. After that, in step A39, when it is determined that 7 seconds has passed from the start of the processing, the process returns to step A21 to perform the second cycle of detection.

On the other hand, the interrupt handling of FIG. 14(c) starts when triggered in step A20 of FIG. 14(a), and steps B1 through B8 are repeated for every 1 second. In steps B1 and B2, the reset switches S1 and S1a are turned on, after which in step B3 the timer is started. In step B4, a determination is made as to whether or not 10 msec has passed. When the on period of 10 msec has passed, the reset switches S1 and S1a are turned off in steps B5 and B6. In step B7, the timer is restarted, and in step B8, a determination is made as to whether or not 0.99 sec has passed. When the off period of 0.99 sec has passed, the process returns to step B1, repeating the same processing, thereby charging and discharging (increasing the time constant) of the offset compensating circuits 40 and 40a.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An inclination angle detection apparatus comprising:
    a sensor for sensing the angle of inclination;
    a differential amplifier for amplifying an output of the sensor;
    an offset compensating circuit which supplies a reference voltage to an input terminal of the differential amplifier by comparing an output of the differential amplifier with a constant value and integrating a differential output resulting from subtraction between the output of the differential amplifier and the constant value;
    a switching means to increase a time constant for increasing the total integration time constant of the offset compensating circuit so as to be greater than the time constant of integrating elements thereof by intermittently supplying the output of the differential amplifier to the offset compensating circuit; and
    a means for detecting the angle of inclination in response to the output of the differential amplifier.

2. An inclination angle detection apparatus according to claim 1, wherein the apparatus is mounted in an automobile, and provided with an initializing means for initializing integrating elements of the offset compensating circuit when the automobile is parked.

3. An inclination angle detection apparatus according to claim 2, wherein the initializing means continually turns on the switching means.

4. An inclination angle detection apparatus according to claim 1, wherein the total integration time constant of the offset compensating circuit is varied by varying the on/off duty ratio of the switching means.

5. An inclination detection apparatus according to claim 1, comprising a low-pass filter for eliminating external vibrations by removing low frequency components from the output of the differential amplifier.

6. An inclination detection apparatus according to claim 1, comprising a switching means for intermittently driving the inclination sensor.

7. An inclination detection apparatus according to claim 1, wherein the apparatus has two constructions each comprising the inclination sensor, the differential amplifier, the offset compensating circuit, the switching means and the detection means and detects inclinations in both a width direction and a longitudinal direction.

8. An automobile theft alarm apparatus comprising:
    a sensor mounted in the automobile for sensing the angle of inclination;
    a differential amplifier for amplifying an output of the sensor;
    an offset compensating circuit which supplies a reference voltage to an input terminal of the differential amplifier by comparing an output of the differential amplifier with a constant value and integrating a differential output resulting from subtraction between the output of the differential amplifier and the constant value;
    a switching means for increasing a time constant for increasing the total integration time constant of the offset compensating circuit so as to be greater than the time constant of integrating elements thereof by intermittently supplying the output of the differential amplifier to the offset compensating circuit; and
    an alarm means for issuing an alarm when the output of the differential amplifier exceeds a predetermined value.

9. An automobile theft alarm apparatus according to claim 8, wherein the apparatus is provided with an initializing means for initializing integrating elements of the offset compensating circuit when the automobile is to parked.

10. An automobile theft alarm apparatus according to claim 9, wherein the initializing means continually turns on the switching means.

11. An automobile theft alarm apparatus according to claim 8, wherein the total integration time constant of the offset compensating circuit is varied by varying the on/off duty ratio of the switching means.

12. An automobile theft alarm apparatus according to claim 8, comprising a low-pass-filter for eliminating external vibrations from outside of the automobile by removing low frequency components from the output of the differential amplifier.

13. An automobile theft alarm apparatus according to claim 8, comprising a switching means for intermittently driving the inclination sensor.

14. An automobile theft alarm apparatus according to claim 8, wherein the apparatus has two constructions each comprising the inclination sensor, the differential amplifier, the offset compensating circuit, the switching means and the detection means and detects inclinations in both a width direction and a longitudinal direction.

* * * * *